Oct. 6, 1964 MASAHIKO ÔKURA 3,151,344
CUSHION SEAT
Filed Feb. 27, 1963
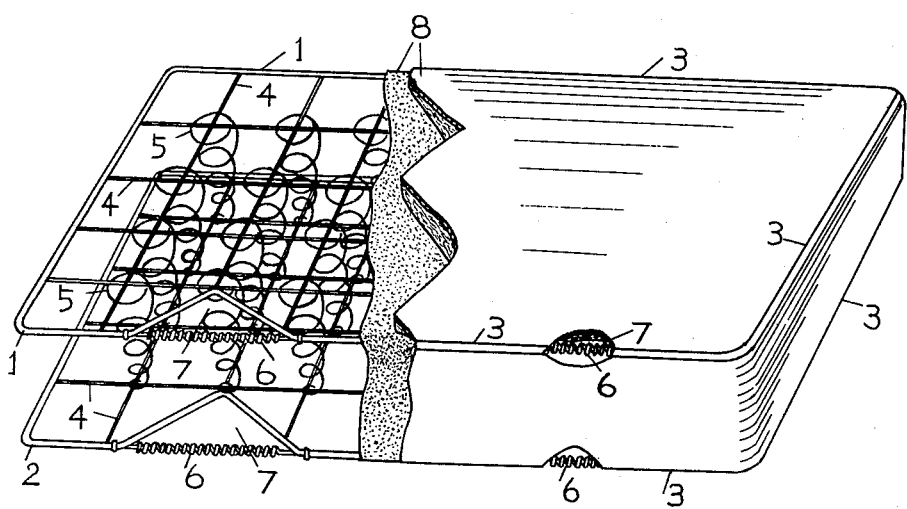
INVENTOR
MASAHIKO ÔKURA
BY Raymond W Colton
ATTORNEY

United States Patent Office 3,151,344
Patented Oct. 6, 1964

3,151,344
CUSHION SEAT
Masahiko Ôkura, 72-chome Siba Siroganedai-machi,
Minato-ku, Tokyo, Japan
Filed Feb. 27, 1963, Ser. No. 261,334
5 Claims. (Cl. 5—351)

This invention relates to a cushion used as a seat, and particularly to the type of seat incorporating springs.

This invention is widely applicable to seats generally, such as those used for automotive vehicles, railway cars, and the like, and for home and office furniture.

The cushion seat contemplated by this invention provides a relatively flexible zone in its front edge where it is engaged by the legs of a seated person. In conventional cushion seats, and particularly those using springs as cushioning elements, the entire periphery of the seat is customarily defined by main frames including lower and upper frame members within a covering material, composed of hard, metallic relatively stiff material, such as thick wire.

According to the present invention, the major portions of the periphery are provided by each frame member, the remainder being defined by resilient bridging elements so that desired portions of the periphery can be deflected to a suitable depth by virtue of the elasticity of such elements. For this purpose, indentations are formed in the main frame members, and suitable elastic elements, such as springs, rubber cords, or the like, are stretched in front of the indentations respectively, so as to render the periphery of the frame members substantially continuous, though readily deflectable in these zones.

The objects of the present invention contemplate the provision of a cushion seat capable of being deflected readily by pressure imposed by the legs of a person sitting on it, and thereby enabling the person to change his sitting position easily and to alleviate fatigue which customarily attends sitting for a long period of time.

The preferred form of the invention will now be described with respect to the accompanying drawing.

The single figure is a perspective view, partially broken away, of a cushion seat for an automobile shown as one embodiment to illustrate the invention.

Upper and lower frame members 1 and 2 provide the greater continuous portions of the peripheral edges 3 of the seat and cooperate with a desired number of intermediate members 4 and a desired number of coil springs 5 which are interposed between the upper and lower frame members to define a cushioning body. Coil springs 6 more flexible than the material composing the frame members, are stretched respectively in front of substantially vertically aligned indentations 7 which are formed in the front edges of the frame members 1 and 2 respectively, so as to form bridges which become substantially continuations of the front edges of the frame members and thereby complement the indented portions 7 of the frames.

Where the interior frame is thus constructed, a cushion seat is completed by the application of suitable covering materials 8. By virtue of the springs 6, pressure imposed by the legs of a seated person will result in deflection, permitting the person to change his sitting posture readily and to feel comfortable even after sitting for a long time.

It will be evident that the present invention is applicable to seats utilizing any types of cushioning elements.

I claim:

1. A cushion seat comprising vertically spaced upper and lower frame members containing substantially vertically aligned indentations providing an interrupted peripheral configuration along an edge of said seat, and a resilient element more flexible than said frame members bridging each of said indentations and rendering said edge substantially continuous.

2. A cushion seat as set forth in claim 1 wherein springs are interposed between said frame members.

3. A cushion seat as set forth in claim 1 wherein each said resilient element is a coil spring.

4. A cushion seat as set forth in claim 1 wherein each said resilient element is an elastic cord.

5. A cushion seat as set forth in claim 1 wherein each said resilient element is a rubber cord.

References Cited in the file of this patent

UNITED STATES PATENTS

| | | |
|---|---|---|
| 1,982,941 | Wunderlich | Dec. 4, 1934 |
| 2,890,464 | Frey | June 16, 1959 |
| 3,089,154 | Boyles | May 14, 1963 |